United States Patent [19]

Richard et al.

[11] Patent Number: 4,701,008

[45] Date of Patent: Oct. 20, 1987

[54] OPTICAL WAVEGUIDE INCLUDING SUPERSTRATE OF NIOBIUM OR SILICON OXYNITRIDE AND METHOD OF MAKING SAME

[75] Inventors: Fred V. Richard, Scottsdale; Fred S. Hickernell, Phoenix; Frederick Y. Cho, Scottsdale, all of Ariz.

[73] Assignee: Motorola, Inc., Schaumburg, Ill.

[21] Appl. No.: 639,634

[22] Filed: Aug. 10, 1984

[51] Int. Cl.$^4$ .............. G02B 6/10; H01L 21/00; B44C 1/22

[52] U.S. Cl. .............. 350/96.12; 350/96.34; 350/320; 156/655; 156/657; 437/5

[58] Field of Search .............. 350/96.10, 96.11, 96.12, 350/96.13, 96.14, 96.34, 96.31, 320; 357/17, 19; 29/576 R, 569 R, 569 L, 572; 156/653, 655, 656, 657

[56] References Cited

U.S. PATENT DOCUMENTS

| | | | |
|---|---|---|---|
| 3,999,835 | 12/1976 | Newns et al. | 350/96.31 |
| 4,048,591 | 9/1977 | Auracher | 350/96.14 X |
| 4,095,869 | 6/1978 | Reichelt et al. | 350/96.14 |
| 4,203,744 | 5/1980 | Schultz et al. | 65/112 |
| 4,273,445 | 6/1981 | Thompson et al. | 350/96.11 X |
| 4,367,916 | 1/1983 | Mottier et al. | 350/96.12 |
| 4,375,312 | 3/1983 | Tangonan | 350/96.12 |
| 4,381,138 | 4/1983 | Buhl | 350/96.14 |
| 4,431,263 | 2/1984 | Garito | 350/96.34 |

OTHER PUBLICATIONS

Hammer et al., "High-Speed Electrooptic Waveguide Grating Modulator using Epitaxial ZnO" IEEE J. of Quant. Elect. vol. QE-11, No. 4, 4/75, pp. 138-148.

Rand et al, "Silicon Oxynitride Films on Fused Silica for Optical Waveguides" Applied Optics vol. 11, No. 11, 11/72, pp. 2482-2488.

*Primary Examiner*—William L. Sikes
*Assistant Examiner*—Brian M. Healy
*Attorney, Agent, or Firm*—Raymond J. Warren; Eugene A. Parsons

[57] ABSTRACT

An apparatus and method is disclosed for providing an optical waveguide that is placed in the same plane as the electrodes, thereby creating a more efficient electro optic interaction that requires less voltage to induce the desired effects on the waveguide. In addition, a superstrate is used to cover the waveguide having an index of refraction slightly less than the index of refraction of the waveguide which reduces the scattering loss inherent in the waveguide.

6 Claims, 5 Drawing Figures

– PRIOR ART –

OPTICAL WAVEGUIDE INCLUDING SUPERSTRATE OF NIOBIUM OR SILICON OXYNITRIDE AND METHOD OF MAKING SAME

BACKGROUND OF THE INVENTION

1. Field of the Invention

This invention relates, in general, to waveguides and, more particularly, to optical waveguides.

2. Description of the Background

A typical optical waveguide is formed by diffusion of Titanium into a substrate material, such as Lithium Niobate and will have electrodes placed on the surface of the substrate and to either side of the waveguide. These types of electro-optical devices have a very low electro-optical efficiency (overlap factors of approximately 0.1 to 0.2).

SUMMARY OF THE INVENTION

Accordingly, it is an object of the present invention to provide an electro-optically efficient optical waveguide.

A further object of the present invention is to provide an optical waveguide that requires lower drive voltage and therefore has a lower power dissipation.

Yet another object of the present invention is to provide an optical waveguide that will allow higher modulation or switching bandwidths.

Still another object of the present invention is to provide a single mode ridge optical waveguide having reasonable dimensions.

Still another object of the present invention is to provide an optical waveguide having a potential reduction in scattering or bend loss.

Still another object of the present invention is to provide an optical waveguide having tunable coupling between parallel ridge guides.

Still another object of the present invention is to provide an optical waveguide having passivation of channel waveguides and electrode structures.

The above and other objects and advantages of the present invention are provided by an apparatus and method of placing the optical waveguide and electrodes in the same plane and by coating the waveguide with a superstrate having a variable index of refraction.

A particular embodiment of the present invention comprises an apparatus and method that either raises the optical waveguide above the substrate or lowers the substrate below a diffused waveguide. The electrodes are then placed in a plane parallel to the waveguide. Having the electrodes parallel to the waveguide creates a much larger electro-optic efficiency as the waveguide is now in a direct line between the electrodes. The waveguide is then covered with a superstrate having a refractive index slightly less than that of the waveguide.

A BRIEF DESCRIPTION OF THE DRAWINGS

DETAILED DESCRIPTION OF THE DRAWINGS

Figures 1, 2:
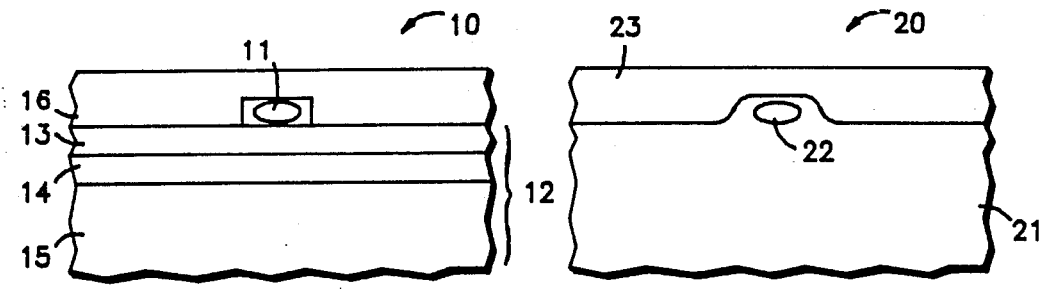
FIG. 1 is a cross section of an optical waveguide structure embodying the present invention.
FIG. 2 is a cross section of another optical waveguide structure embodying the present invention.

Referring to the diagram of FIG. 1 a cross section of an optical waveguide structure, generally designated 10, is illustrated. Structure 10 has a waveguide 11 made of Zinc Oxide (ZnO) for transmitting the optical signal. Waveguide 11 rests on a substrate 12 having several layers 13, 14 and 15. In substrate 12 layer 13, for example, consists of Silicon Oxynitride (SiON); layer 14 consists of Silicon Dioxide ($SiO_2$) and layer 15 consists of Silicon (Si). Layers 13 and 14 are included to act as a buffer between waveguide 11 and layer 15. This is required since the refractive index of Silicon is larger than the index for ZnO. Should the waveguide be placed directly on a Silicon substrate a large portion of the transmitted signal would be transmitted into the substrate as a result of the differences in the refractive indexes. Layer 14 alone provides a sufficient buffer between waveguide 11 and layer 15. Layer 13 is included in this embodiment of the present invention to provide a constant difference in the refractive index between waveguide 11 and the surrounding materials.

Covering waveguide 11 and over lying substrate 12 is a superstrate 16 which consists of SiON. The SiON of superstrate 16 and layer 13 of substrate 12 is designed to have a variable index of refraction. By sputtering Silicon in an atmosphere having varying amounts of Oxygen and Nitrogen, the index of refraction of the SiON film may be changed. The index of refraction of the SiON layer is desired to be slightly less than that of the waveguide. The reason behind the close proximity of the indexes of refraction of the two elements is to provide a circuit having a small $\Delta n$ or difference in refractive indexes n. Due to imperfections in the surfaces of waveguide 11 the optical signals have a tendency to scatter. The larger the $\Delta n$ the more the scattering occurs. Should an ideal waveguide be achieved, one having completely smooth surfaces, then it would be desired to make $\Delta n$ as large as possible. This would provide tight confinement for the optical signal and allow for smaller radii when the waveguide turns corners, thereby making possible optical circuits having compact geometrics. However, at this point in the art waveguides having completely smooth surfaces are not available. Therefore, to prevent excess scattering of the transmitted signals, waveguide 11 is enclosed by a material having a refractive index close to that of the waveguide. A further advantage of having a small $\Delta n$ is that a single mode guide may be developed with reasonable dimensions.

Referring now to FIG. 2 a cross section of an optical waveguide structure generally designated 20 is illustrated. Structure 20 consists of a substrate 21 made of Lithium Niobate ($LiNbO_3$), a waveguide 22 made of Titanium indiffused Lithium Niobate and a superstrate 23 consisting of Niobium Oxynitride (NbOn). In this particular configuration no buffering layers are required as in FIG. 1 since, unlike FIG. 1, substrate 21 has a refractive index less than that of the diffused Titanium waveguide 22. Once waveguide 22 is diffused into substrate 21 the upper surface of substrate 21 is milled down below the level of waveguide 22. Next, superstrate 23 is deposited on the surface of substrate 21 surrounding waveguide 22. Superstrate 23 in FIG. 2 serves the same purpose as superstrate 16 in FIG. 1. As with the SiON the NbON has an index of refraction that is variable. By sputtering Niobium in an atmosphere having varying amounts of Oxygen and Nitrogen, the index of refraction of the deposited Niobium Oxynitride film may be changed.

Figures 3, 4:
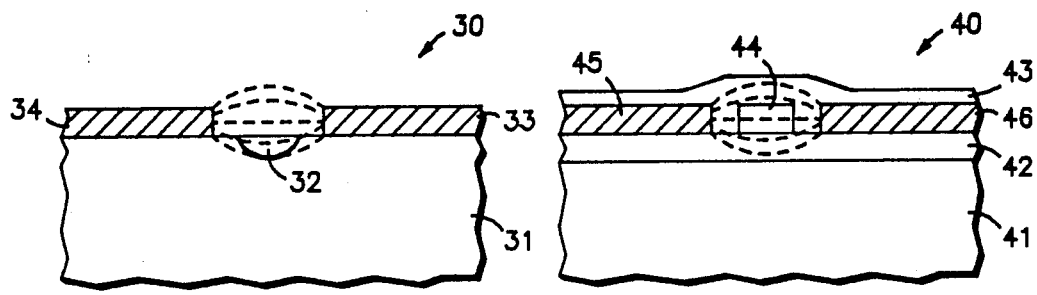
FIG. 3 is a cross section of a prior art waveguide.
FIG. 4 is a partial cross section of an optical waveguide embodying the present invention illustrating the placement of the electrodes.

Referring now to FIG. 3 a cross section of a prior art waveguide structure, generally designated 30, is illustrated. Structure 30 consists of a substrate 31 having a waveguide 32 formed therein by diffusing a substance into substrate 31. Located above substrate 31 and to either side of waveguide 32 is a set of electrodes 33 and 34. The electrical field E generated by electrodes 33 and 34 is illustrated by a series of dotted lines. As is illustrated, only the fringing field affects waveguide 32. This results in a low electro-optic efficiency factor of approximately 0.1 to 0.2.

Figure 5:
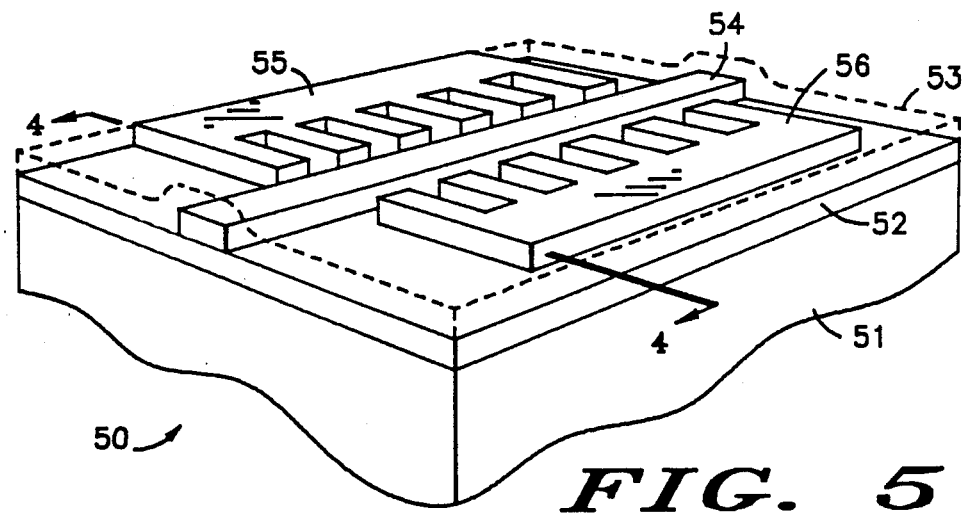
FIG. 5 is a perspective view of an optical waveguide structure embodying the present invention.

Referring now to FIG. 4 a cross section of an optical waveguide structure, taken along line 4—4' of FIG. 5 and generally designated 40, embodying the present invention is illustrated. Structure 40 may consist of a substrate 41 made of Silicon; a buffer region 42, which may be a single layer of Silicon Dioxide or a double layer of Silicon Dioxide and Silicon Oxynitride as in FIG. 1; a superstrate 43 made of Silicon Oxynitride; a waveguide 44 made of Zinc Oxide and a pair of electrodes 45 and 46. As illustrated here electrodes 45 and 46 are placed on the same plane as, and are juxtaposed to, waveguide 44. By positioning waveguide 44 directly between electrodes 45 and 46 the electric field E, illustrated by the dashed lines, has a more direct effect on the waveguide 44 than the fringing field effects have on waveguide 32 in FIG. 3. The novel structure increases the electro-optic efficiency of waveguide 44 from the range 0.1-0.2 as in FIG. 3 to 0.8-0.9. This substantial increase in efficiency results in a lower drive voltage being required to have the same effect on the waveguide 44 as in the prior art. The reduction in the required drive voltage in turn results in a lower power dissipation. Since less voltage is required to have the same effect as in the prior art the operational bandwidth of devices is not limited by the slew rates of driving sources. In addition, the SiON superstrate passivates the waveguide and electrode structures.

Referring now to FIG. 5 a perspective view of an optical waveguide structure, generally designated 50, embodying the present invention is illustrated. Structure 50 consists of a substrate 51 made of Silicon; a buffer region 52, which may be a single layer of $SiO_2$ or a double layer as in FIG. 1; a superstrate 53 made of SiON; a waveguide 54 made of ZnO and a pair of electrodes 55 and 56. As illustrated here electrodes 55 and 56 are placed on either side of waveguide 54 as in FIG. 4.

It is to be understood that while specific embodiments have been illustrated a variety of compounds may be substituted for the different elements of these waveguide structures.

Thus, it is apparent that there has been provided, in accordance with the invention, a device and method that fully satisfies the objects, aims, and advantages set forth above.

It has been shown that the present invention has the advantage of providing a waveguide with an electro-optic efficiency factor in excess of 0.8, thereby requiring a lower voltage than the prior art and in turn has a lower power dissipation. While the invention has been described in conjunction with specific embodiments thereof, it is evident that many alterations, modifications, and variations will be apparent to those skilled in the art in light of the foregoing description. Accordingly, it is intended to embrace all such alternatives, modifications, and variations in the appended claims.

We claim:
1. A channel optical waveguide device comprising:
    a substrate of Lithium Niobate ($LiNbO_3$) having an index of refraction;
    a channel optical waveguide of Titanium (Ti) in diffused Lithium Niobate ($LiNBO_3$) formed on said substrate and having an index of refraction greater than that of said substrate; and
    a superstrate of Niobium Oxynitride (NbON) covering said optical waveguide, said superstrate having an index of refraction less than the index of refraction of said optical waveguide.
2. The optical waveguide device of claim 1 which further comprises a pair of electrodes, each electrode being mounted on said substrate, each electrode being placed in the same plane as said waveguide one on each side of said waveguide, and each electrode being juxtaposed to said waveguide.
3. A method of constructing a channel optical waveguide comprising the steps of:
    providing a substrate;
    placing a buffer layer comprising Silicon Oxynitride (SiON) on said substrate, said buffer layer having a first surface and a first index of refraction;
    placing a waveguide comprising Zinc Oxide (ZnO) on said first surface of said buffer layer, said waveguide having a second index of refraction greater than the first index of refraction;
    placing an electrode on either side of said waveguide, said electrodes also being placed on said first surface of said buffer; and
    coating said electrodes with a superstrate comprising Silicon Oxynitride (SION), said superstrate having an index of refraction substantially equal to the first index of refraction.
4. A method of constructing a channel optical waveguide comprising the steps of:
    providing a substrate comprising Lithium Niobate ($LiNbO_3$);
    diffusing an optically transmissive material comprising Titanium (Ti) into said substrate creating a waveguide having an increased index of refraction;
    milling the level of said substrate on either side of said waveguide down to a level below said waveguide;
    placing an electrode on either side of said waveguide on said substrate; and
    covering said waveguide with a superstrate comprising Niobium Oxynitride (NbON) having an index of refraction slightly less than the index of refraction of said waveguide.
5. A channel optical waveguide device comprising:
    a substrate;
    a buffer layer including Silicon Oxynitride (SiON) formed in overlying relationship on said substrate and having a first index of refraction;
    a channel optical waveguide including Zinc Oxide (ZnO) formed on said buffer layer and having an index of refraction greater than the first index of refraction; and
    a superstrate comprising Silicon Oxynitride (SiON) covering said channel optical waveguide, said superstrate having an index of refraction substantially the same as the first index of refraction.
6. A channel optical waveguide device as claimed in claim 5 further including a pair of electrodes, each electrode being mounted on the buffer layer, each electrode being placed in the same plane as the channel optical waveguide and on opposite sides thereof, and each electrode being juxtaposed to said channel optical waveguide.

* * * * *